US008549174B2

(12) United States Patent
Jiang et al.

(10) Patent No.: US 8,549,174 B2
(45) Date of Patent: Oct. 1, 2013

(54) ROUTING METHOD FOR NETWORK AND SENSING SYSTEM

(75) Inventors: Joe-Air Jiang, Taipei (TW); Jyh-Cherng Shieh, Taipei (TW); En-Cheng Yang, Taipei (TW); Chwan-Lu Tseng, Taipei (TW); Fu-Ming Lu, Taipei (TW); Kuo-Chi Liao, Taipei (TW); Cheng-Long Chuang, Yilan County (TW); Tzu-Shiang Lin, Taichung (TW); Chia-Pang Chen, Changhua County (TW)

(73) Assignee: National Taiwan University, Taipei (TW)

( * ) Notice: Subject to any disclaimer, the term of this patent is extended or adjusted under 35 U.S.C. 154(b) by 926 days.

(21) Appl. No.: 12/690,860

(22) Filed: Jan. 20, 2010

(65) Prior Publication Data
US 2011/0055424 A1    Mar. 3, 2011

(30) Foreign Application Priority Data

Sep. 1, 2009   (TW) .............................. 98129467 A

(51) Int. Cl.
*G06F 15/173*    (2006.01)

(52) U.S. Cl.
USPC ......................... 709/238; 709/241; 709/242

(58) Field of Classification Search
None
See application file for complete search history.

(56) References Cited

U.S. PATENT DOCUMENTS

| | | | |
|---|---|---|---|
| 7,184,421 B1* | 2/2007 | Liu et al. ....................... | 370/338 |
| 7,281,057 B2* | 10/2007 | Cain ............................. | 709/238 |
| 7,385,503 B1* | 6/2008 | Wells et al. .............. | 340/539.26 |
| 7,830,838 B2* | 11/2010 | Kohvakka et al. ............ | 370/330 |
| 8,041,834 B2* | 10/2011 | Ferri et al. .................... | 709/238 |
| 2004/0018839 A1 | 1/2004 | Andric et al. | |
| 2010/0074133 A1* | 3/2010 | Kim et al. ..................... | 370/252 |

* cited by examiner

*Primary Examiner* — Mohamed Ibrahim

(57) ABSTRACT

A routing method for a network is provided. The routing method includes the steps of a) selecting one of a plurality of basic nodes as a cluster head; b) broadcasting a first message by the cluster head; c) continuing to broadcast the first message by any of the plurality of basic nodes which receives the first message, until all the plurality of basic nodes receive the first message; and d) selecting a corresponding father node by each of the plurality of basic nodes based on an information associated with the first message.

20 Claims, 4 Drawing Sheets

US 8,549,174 B2

ROUTING METHOD FOR NETWORK AND SENSING SYSTEM

FIELD OF THE INVENTION

The present invention relates to a routing method for a network, especially to a routing method for a wireless sensor network based on the multi-hop algorithm by considering the energies and covering areas.

BACKGROUND OF THE INVENTION

The concept of the wireless sensor network (WSN) has already been proposed for a few years. Under the development of modern technologies, the sensors with the capabilities of wireless transmission have already had small size, low cost and the abilities of sensing environmental conditions and processing information. In traditional applications, a large number of wireless sensors are spread over an area, so that a large area can be covered and sensed, and the environmental information collected by these wireless sensors can be transmitted back to the base station for the processing and analysis. However, due to the limitation of the energy consumption, the transmission distance, the signal reception and other restrictions, there are many difficulties and obstacles for the WSN applications.

In order to solve these problems, there are already known technologies exploring the ways to reduce the sensor's power consumption and extend the service life in order to enhance the efficiency of using WSN. The earliest research method is the routing protocol of the Low-Energy Adaptive Cluster Hierarchy (LEACH).

In the LEACH approach, the WSN is divided into several clusters, and a cluster head for each cluster is selected from the several sensors in each cluster. The sensors in each cluster will transmit the data to the cluster head in that cluster, and the cluster head in each cluster will then transmit data to the base station. This cluster-type structure can effectively reduce energy consumption and extend the network lifetime.

In addition, various WSNs based on the clusters have been proposed, some of these WSNs consider the residual energy of the cluster head, some try to find the shortest transmission distance, and some consider the sensing information. After the LEACH is proposed, a routing protocol, called LEACH-Coverage-U, based on LEACH is proposed. In this method, the overlapping area between the sensing area of one sensor and that of another sensor is taken into account, and the sensor with the highest degree of overlapping area with the other sensors is selected as the cluster head for that region. Compared with LEACH, this method is able to further extend the network lifetime.

However, the above mentioned methods still have many deficiencies and blind spots for sensing. Some applications, such as the military inspections, medical cares, and some emergency missions, are not allowed any mistakes happening, and the conventional techniques are not good enough to handle.

For solving the above mentioned problems, the inventors had done a lot of efforts in the analyses, researches and developments, and finally developed the routing method for the wireless sensor network.

SUMMARY OF THE INVENTION

The present invention provides a routing method by using a multi-hop routing algorithm to reach 100% network coverage. By improving the conventional methods, the present method can acquire sensing information for the complete area to be sensed, and simultaneously reduce the energy consumption and prolong the lifetime of the network.

In accordance with one aspect of the present invention, a routing method for a network is provided. The routing method comprises steps of a) selecting one of a plurality of basic nodes as a cluster head; b) broadcasting a first message by the cluster head; c) continuing to broadcast the first message by any of the plurality of basic nodes which receives the first message, until all the plurality of basic nodes receive the first message; and d) selecting a corresponding father node by each of the plurality of basic nodes based on an information associated with the first message.

Preferably, the routing method further comprises steps of e) through the each basic node transmitting the first message and a sensing message collected by the each basic node to the corresponding father node; f) receiving the first message and the sensing message from the corresponding father node by the cluster head; and g) transmitting the first message and the sensing message to a base station by the cluster head, wherein the network is a wireless sensor network.

Preferably, the step a) further comprises a substep of calculating a first weighting value to select the cluster head based on a residual electric power in the each basic node; a ratio of an overlapping area between a covering area of the each basic node and a covering area of other basic node(s) of the plurality of basic nodes to the covering area of the each basic node; and a distance between the each basic node and the base station, wherein the covering area is a sensing area of the each basic node, and the sensing area includes one of a quantity of at least an interested spot to be sensed and an area to be sensed; and the step d) further comprises substeps of grouping the plurality of basic nodes into a plurality of basic node sets, and selecting a specific basic node of a specific basic node set to serve as a father node of the specific node set to which the each basic node belongs.

Preferably, the routing method further comprises a step of h) repeating the steps a) to g) when at least one of the plurality of basic nodes still has an available electric power.

Preferably, the step d) further comprises a substep of calculating a second weighting value to select the corresponding father node based on a distance between the basic each node and another one of the plurality of basic nodes, and a residual electric power of the another basic node.

In accordance with another aspect of the present invention, a sensing system is provided. The sensing system comprises a plurality of basic nodes; a plurality of father nodes, each of which is selected from the plurality of basic nodes, corresponds to at least one of the plurality of basic nodes, and receives a first message from the corresponding basic node; a cluster head receiving the first message from the plurality of father nodes; and a base station receiving the first message from the cluster head.

Preferably, the sensing system is a wireless sensor network system, and uses a multi-hop routing algorithm including a calculation of plural rounds to select the cluster head based on a first maximum weighting value, and to select the plurality of father nodes based on a second maximum weighting value.

Preferably, the first maximum weighting value is calculated to select the cluster head based on a residual electric power in each of the plurality of basic nodes; a ratio of an overlapping area between a covering area of the each basic node and a covering area of other basic node(s) of the plurality of basic nodes to the covering area of the each basic node; and a distance between the each basic node and the base station, wherein the covering area is a sensing area of the each basic node, and the sensing area includes one of a quantity of at least an interested spot to be sensed and an area to be sensed.

Preferably, each of the plurality of basic nodes corresponds to at least a candidate node for transmitting the first message, and the second maximum weighting value is calculated based on a residual electric power of the candidate node and a respective distance between the candidate node and the each basic node so as to select one of the candidate node(s) as the father node for the each basic node.

Preferably, when one of the plural rounds in the multi-hop routing algorithm is completed, and at least one of the plurality of basic nodes still has an available electric power, then another one of the plural rounds proceeds.

Preferably, the sensing message comprises one selected from a group consisting of a parameter, an imago message, an audio message and a combination thereof.

In accordance with a further aspect of the present invention, a routing method for a network is provided. The routing method comprises steps of a) selecting one of a plurality of basic nodes as a cluster head; b) building a plurality of hierarchical levels for the plurality of basic nodes based on an information associated with the cluster head; and c) sequentially transmitting a first message by the plurality of basic nodes according to the hierarchical levels.

Preferably, the routing method further comprises steps of d) receiving the first message by the cluster head; and e) transmitting the first message to a base station by the cluster head.

Preferably, the routing method further comprises a step of f) repeating the steps a) to e) when at least one of the plurality of basic nodes still has an available electric power.

Preferably, the step a) further comprises a substep of calculating a first weighting value to select the cluster head based on a residual electric power in each of the plurality of basic nodes; a ratio of an overlapping area between a covering area of the each basic node and a covering area of other basic node(s) of the plurality of basic nodes to the covering area of the each basic node; and a distance between the each basic node and the base station, wherein the covering area is a sensing area of the each basic node, and the sensing area includes one of a quantity of at least an interested spot to be sensed and an area to be sensed.

Preferably, each of the plurality of basic nodes corresponds to at least a candidate node for transmitting the first message, the step b) further comprises a substep of building the plurality of hierarchical levels based on a respective distance between the each basic node and the cluster head, and the step c) further comprises a substep of calculating a second weighting value based on a residual electric power of the candidate node and a respective distance between the candidate node and the each basic node to determine which candidate node in each of the hierarchical levels is to receive the first message.

Preferably, the first message comprises at least one selected from a group consisting of codes of each of the plurality of basic nodes and the cluster head, residual electric quantities of the each basic node and the cluster head, the hierarchical levels of the each basic node and the cluster head, a distance between the each basic node and one of the plurality of basic nodes adjacent to the each basic node, a distance between the cluster head and one of the plurality of basic nodes adjacent to the cluster head, and a sensing message including at least one of an environmental message and an environmental changing condition within a sensing area of the each node.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Here we define a specific region, where several nodes, i.e. sensors, are randomly distributed. Each of the sensors has its own sensing capability and sensing area. There are several interested spots in this specific region. The interested spots are the specific spots expected to be sensed. After the distribution of the sensors, each of the sensors can know what interested spots exist within its sensing area. A base station may be located inside or outside this specific region, and receive the sensing information collected by each sensor. In addition, the distance here can be referred to the strength of the communicated signals between one node and another node or between the node and base station. That is to say, if the signal transmitted or received between two nodes or between the node and base station is strong, then it is determined that the distance between the two nodes or between the node and base station is short. The algorithm proposed in the present invention is based on the premise of 100 percent of the wireless network sensing coverage. That is, each of the interested spots is covered by the covering area of at least one node. The above setting can be achieved by the current technologies, and therefore it is not described in detail here.

Figure 1:
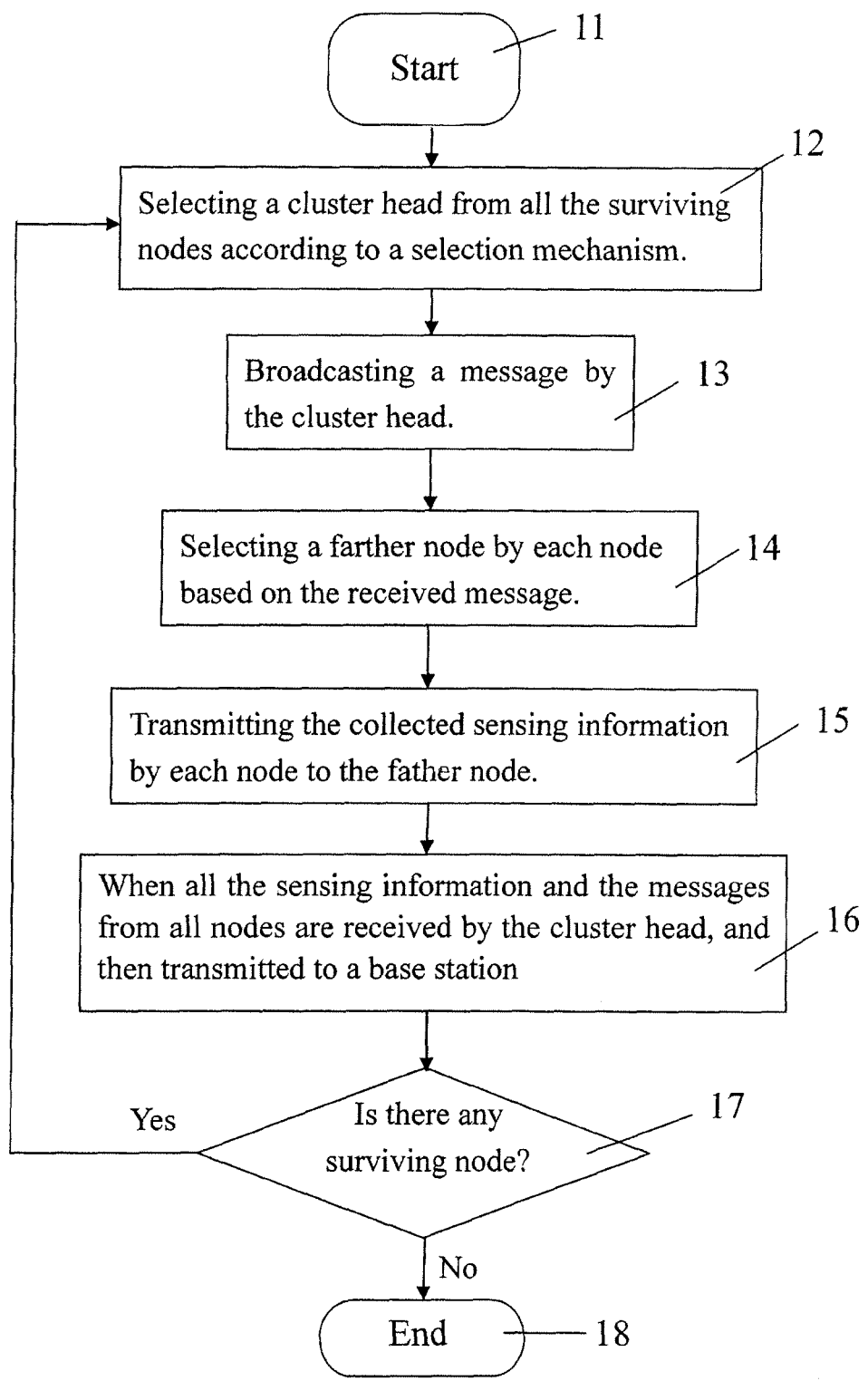
FIG. 1 is the schematic diagram showing the flowchart of the multi-hop routing algorithm of the present invention.

Please refer to FIG. 1, which is the flowchart of the multi-hop routing algorithm of the present invention. The algorithm starts at the step 11. Then, in the step 12, a cluster head is selected from all the surviving nodes, i.e. the nodes still having available residual electric powers, sensing capabilities and transmission capabilities, according to a selection mechanism. The selection mechanism of selecting a cluster head is based on the first weighting value H. The first weighting value H is defined as follows:

$$H_i = (RE_i) \times \left(\frac{|O(S_i)|}{|C(S_i)|}\right) \times \left(\frac{1}{d(S_i, BS)}\right) \quad \text{Equation (I)}$$

where $H_i$ is the first weighting value of the i-th node ($S_i$), $RE_i$ is the current residual electric power of the i-th node, $C(S_i)$ is the quantity of the interested spots within a sensing (or covering) area of the i-th node, $O(S_i)$ is the quantity of the interested spots within a overlapping area between a sensing area of the i-th node and all sensing areas of the other nodes, BS is a base station, and $d(S_i,BS)$ is the distance between the i-th node and the base station, where the distance can be determined based on the strengths of transmitted or received signals.

Figure 2:
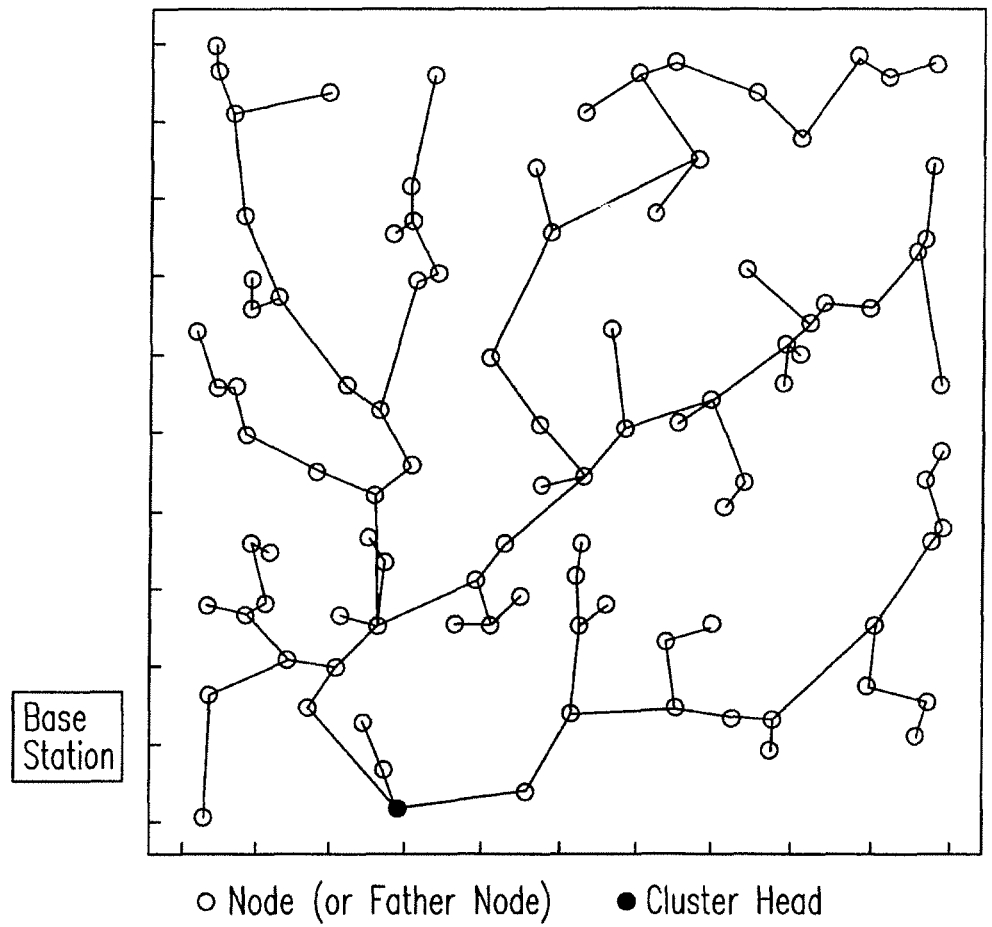
FIG. 2 is the schematic diagram showing the topology of the wireless sensor network of the present invention.

From the above definition, if $RE_i$ is larger, it is meant that the current residual electric power of the i-th node is larger; if the ratio of $O(S_i)$ to $C(S_i)$ is closer to 1, it is meant that a larger portion of (or even all) the interested spots within the sensing area of the i-th node are also the interested spots within the sensing area of the other nodes, and therefore the sensing role of this i-th node is less important and can be replaced by other nodes; if $d(S_i,BS)$ is smaller, it is meant that the distance between the i-th node and BS is shorter. Thus, by adopting these three parameters, it can be understood that if the $H_i$ is greater, i.e. higher current residual electric power in this i-th node, less important for the sensing role of the i-th node, or short distance between the i-th node and the base station, then the i-th node is more suitable to be selected as a cluster head. For example, please refer to FIG. 2, which shows the topology of the wireless sensor network of one embodiment of the present invention.

After selecting the cluster head through this selection mechanism, in the step 13, the cluster head begins to broadcast a message, which includes the information of the cluster head itself, such as the node code, the current residual electric power. Those nodes, which receive the message sent by the cluster head, can figure out the distance between themselves and the cluster head based on signal intensity (or signal strength) of the received message. After then, these nodes continue to broadcast the messages, and in the meantime, the messages will be updated. In other words, besides the initial information, the messages broadcasted by these nodes include the additional information regarding these nodes themselves, e.g. the node codes, the current residual electric powers, and the distance between the current node and the cluster head. The messages are sequentially received, broadcasted and updated, until all the nodes receive the messages.

Through this way, a hierarchical structure can be built. That is to say, the cluster head starts to transmit the messages. In the following, the nodes receiving the messages can be divided into the first tier (or level), second tier and so on according to the sequential order of their receiving messages. Therefore, when receiving the message, each node can also recognize which tier (or level) it is situated, and can update this information into the message, which is then broadcasted out.

In the step 14, each node can select a specific node as a farther node from the nodes in the first previous tier (i.e. one tier higher than the present tier) according to the received messages. In this selection mechanism, a single node may be a father node of several nodes. The selection can be determined based on a second weighting value $\Phi_k$. The second weighting value $\Phi_k$ is defined as follows:

$$\Phi_k = \left(\frac{1}{d(S_i, S_k)}\right) \times (RE_k) \qquad \text{Equation (II)}$$

where $\Phi_k$ is the second weighting value for the i-th node selecting the k-th node as the father node; $d(S_i,S_k)$ is the distance between the i-th node and the k-th node; $RE_k$ is the current residual electric power of k-node. It can be known from the above definitions that if $RE_k$ is larger, then the current residual electric power of k-node is larger; if the $d(S_i,S_k)$ value is smaller, then the distance between the i-th node and k-th node is shorter. Thus, it can be known from these two parameters that if $\Phi_k$ is larger, then the k-th node contains more current residual electric power, or is located nearer to the i-th node, and accordingly the k-th node is more suitable to be selected as the father node.

In step 15, when all the cluster head and the father nodes in the whole sensing system have been determined, each node can start transmitting its collected sensing information to the selected father node. The sensing information includes the environmental changing conditions and the message of the environment within the sensing area of each node. The sensing information can further include at least one of a parameter, an image message and an audio message. In this step, each node also transmits its own message, e.g. its current residual electric power. After each father node receives these sensing information and messages of its child nodes themselves, the father node will transmit these sensing information and messages by further adding the sensing information by itself and its own message together to its father node in one upper level (or tier). The transmissions will proceed hieratically back to the higher and higher levels. In the step 16, when the cluster head has collected the sensing information and the messages of all the nodes, the cluster head passes and transmits these sensing information and messages to the system of the base station for data processing and arrangement, and the steps of this round are completed.

Meanwhile, the sensing system can determine whether there is any node still surviving in the specific region. In the step 17, if some nodes still survive, then the steps for the next round of the algorithm will proceed. This algorithm will find out the most suitable cluster head and father nodes for the next round. Then, each node transmits the message and the sensing information sequentially in the same way, till the base station receives all the sensing information and the messages. That is, the steps 12 to 16 are repeated. If there is no surviving node, then the whole processes are ended at the step 18.

Compared with the conventional algorithms of LEACH and LEACH-Coverage-U, the multi-hop routing algorithm provided in the present invention can effectively elongate the lifetime of the sensing network system. Please refer to FIGS. 3(a) and 3(b), which are the coordinates of the quantity of the surviving nodes and the percentage of the sensing coverage, respectively, vs. the operation time for the algorithms of the present invention, LEACH and LEACH-Coverage-U.

Figure 3A:
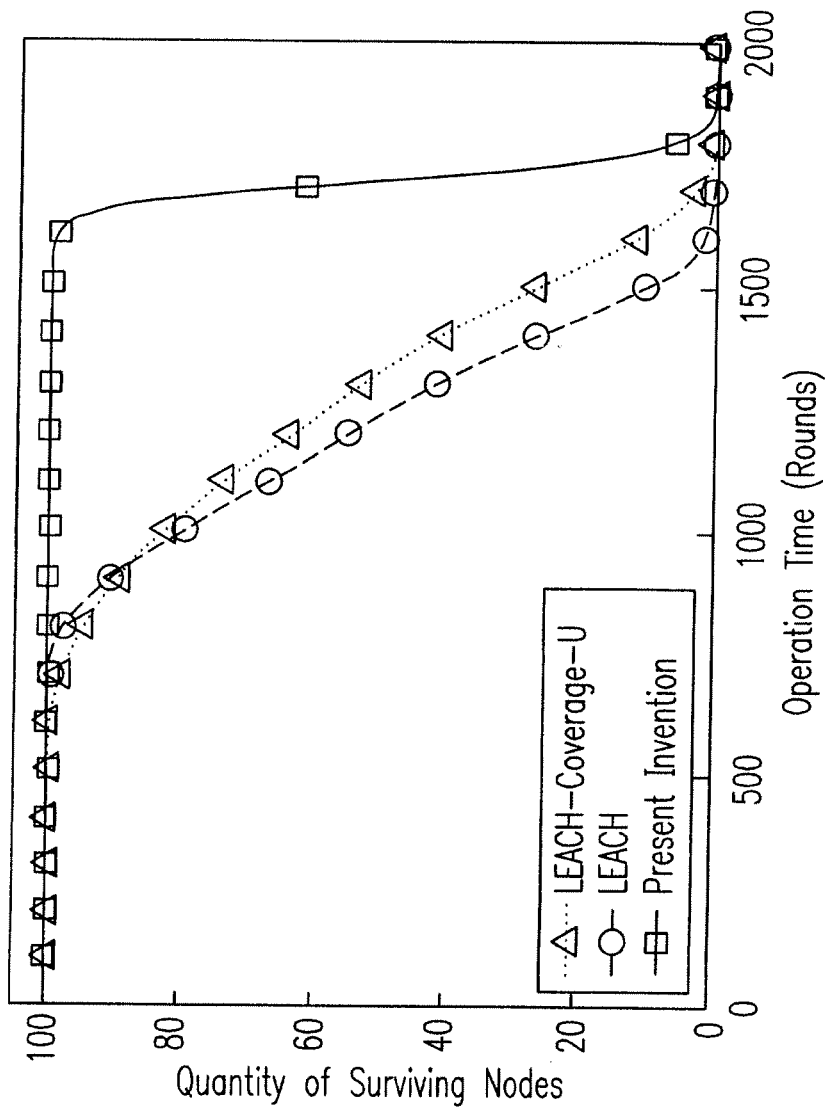
FIG. 3(a) is the schematic diagram showing the coordinate of the quantity of the surviving node vs. the operation time for the methods of the present invention, LEACH and LEACH-Coverage-U.
Figure 3B:
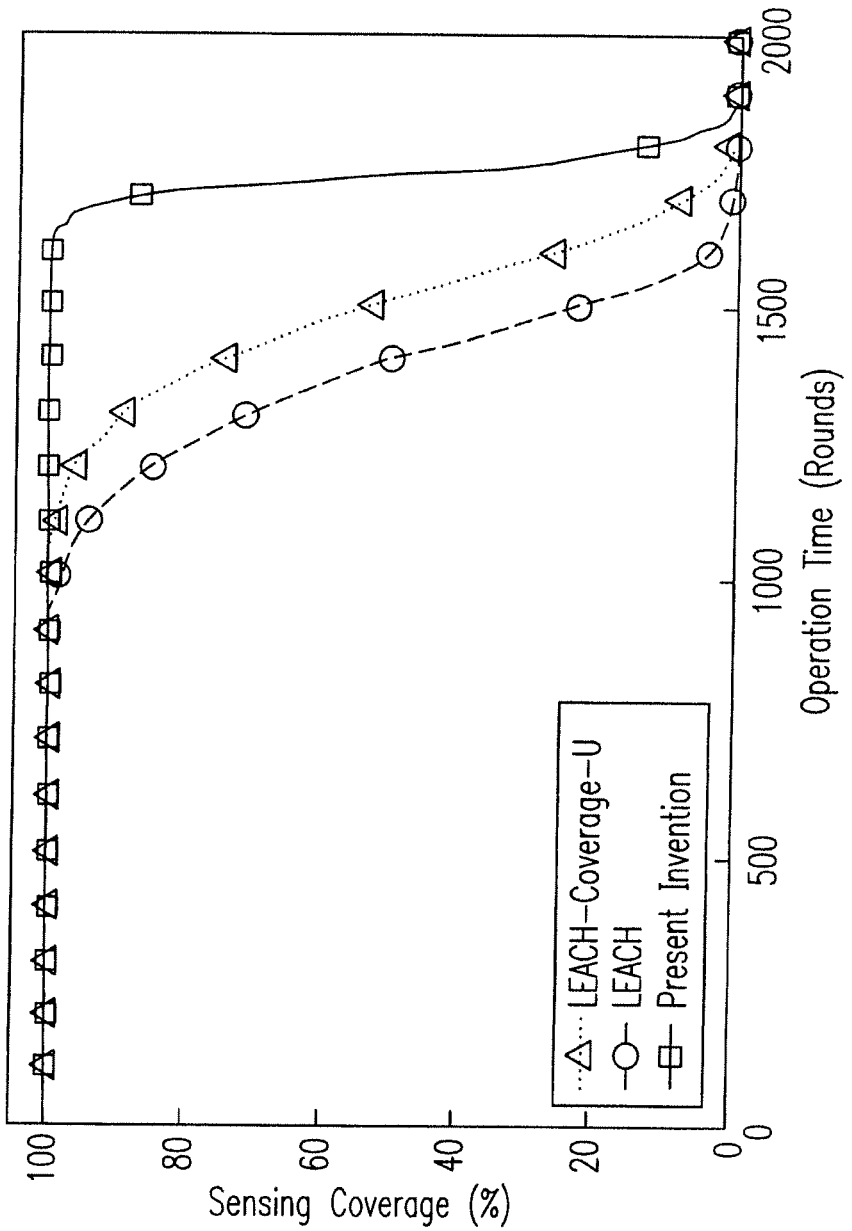
FIG. 3(b) is the schematic diagram showing the coordinate of the percentage of the sensing coverage vs. the operation time for the methods of the present invention, LEACH and LEACH-Coverage-U.

In FIG. 3(a), three algorithms are simulated under the initial condition of 100 nodes in the same region, it can be seen that the algorithm provided in the present invention is able to significantly extend the lifetime of the nodes. For the present invention, no node exhausts its energy, until about the $1550^{th}$ round, and then the curve of the quantity of the surviving nodes begin to rapidly decline. In addition, in FIG. 3(b), it can be sees that the present algorithm is able to significantly extend the time of 100% sensing coverage for the wireless sensor network. The curve of the sensing coverage for the present algorithm continues to keep at the 100% sensing coverage till around the $1590^{th}$ round, and then decreases rapidly. In contrast, the 100% sensing coverage already can not be guaranteed only after around the $1000^{th}$ round for the conventional algorithms of LEACH and LEACH-Coverage-U, i.e. the lifetimes of which are much shorter than that of the present invention. That is to say, since the present algorithm can effectively distribute the consumption of the energy of all nodes, accordingly it can ensure the quality of the overall stability of the wireless sensor network.

In addition, we can further define two coefficients, $\tau_1$ and $\tau_2$, into Equation (I) as follows.

$$H_i = (RE_i)^{\tau_1} \times \left(\frac{|O(S_i)|}{|C(S_i)|}\right)^{\tau_2} \times \left(\frac{1}{d(S_i, BS)}\right) \quad \text{Equation (III)}$$

By the experimental proof, it is found that when $\tau_1=1$, $\tau_2=3.1$, the algorithm of this embodiment by using the first weighting value defined in the Equation (III) is able to further extend the lifetime of the wireless sensor network.

On the other hand, the two coefficients, $\lambda_1$ and $\lambda_2$, can also be further defined into Equation (II) as follow.

$$\Phi_k = \left(\frac{1}{d(S_i, S_k)}\right)^{\lambda_1} \times (RE_k)^{\lambda_2} \quad \text{Equation (IV)}$$

Similarly, when $\lambda_1=0.7$, $\lambda_2=3.3$, the algorithm of this embodiment by using the second weighting value defined in the Equation (IV) is able to further extend the lifetime of the wireless sensor network. Of course, the values of the coefficients of $\tau_1$, $\tau_2$, $\lambda_1$ and $\lambda_2$ shown above are only preferred embodiments, and can be tuned according to the different conditions. The present invention still performs much better than the conventional algorithms no matter whether the above mentioned coefficients are adopted or not.

In the present embodiment, the $O(S_i)$ and $C(S_i)$ in Equations (I) and (III) are defined as the quantity of the interested spots within the sensing area. However, the $O(S_i)$ and $C(S_i)$ can also be defined as the covering area, i.e. the sensing area. Therefore, if the ratio of $O(S_i)$ to $C(S_i)$ approaches one for i-th node, the overlapping area between the sensing area of i-th node and those of the rest nodes become larger, or even the sensing area of i-th node is completed overlapped, then the sensing role of the i-th node is less important, and the i-th node is more suitable to be selected as a cluster head.

In summary, the novel multi-hop routing algorithms and system provided in the present invention for wireless sensor networks have the advantages of energy-saving, even consumption of the energy of the nodes, promoting the network stability, and extending the network lifetime and so on. Regarding the sensing coverage of the network, the present algorithms and system can maintain the 100% sensing coverage for a much long time than the conventional methods. Therefore, for the special applications, such as military detection, medical aid and home security, the present invention is able to better meet the high requirements and to perform the effective full-range sensing and monitoring for all corners of the region, and to provide the detailed sensing information with much higher reliability and longer lifetime of the sensing network system.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A routing method for a network, comprising steps of:
   a) selecting one of a plurality of basic nodes as a cluster head based on a first weighting value, wherein the first weighting value is calculated by a ratio of an overlapping area between a covering area of each of the plurality of basic nodes and a covering area of other basic node(s) of the plurality of basic nodes to the covering area of the each basic node;
   b) broadcasting a first message by the cluster head;
   c) continuing to broadcast the first message by any of the plurality of basic nodes which receives the first message, until all the plurality of basic nodes receive the first message; and
   d) selecting a corresponding father node by the any basic node based on an information associated with the first message.

2. A method according to claim 1, further comprising steps of:
   e) through the each basic node transmitting the first message and a sensing message collected by the each basic node to the corresponding father node;
   f) receiving the first message and the sensing message from the corresponding father node by the cluster head; and
   g) transmitting the first message and the sensing message to a base station by the cluster head, wherein the network is a wireless sensor network.

3. A method according to claim 2, wherein the first message comprises at least one selected from a group consisting of codes of the each basic node and the cluster head, residual electric quantities of the each basic node and the cluster head, hierarchical levels of the each basic node and the cluster head, a distance between the each basic node and one of the plurality of basic nodes adjacent to the each basic node, a distance between the cluster head and one of the plurality of basic nodes adjacent to the clustering head, and the sensing message comprises at least one of an environmental message and an environmental changing condition within a sensing area of the each basic node.

4. A method according to claim 3, wherein the sensing message comprises one selected from a group consisting of a parameter, an image message, an audio message, and a combination thereof.

5. A method according to claim 2, further comprising a step of:
   h) repeating the steps a) to g) when at least one of the plurality of basic nodes still has an available electric power.

6. A method according to claim 1, wherein:
   the step a) further comprises a substep of calculating the first weighting value to select the cluster head based on:
      a residual electric power in the each basic node; and
      a distance between the each basic node and a base station, wherein the covering area is a sensing area of the each basic node, and the sensing area includes one of a quantity of at least an interested spot to be sensed and an area to be sensed; and
   the step d) further comprises substeps of grouping the plurality of basic nodes into a plurality of basic node sets, and selecting a specific basic node of a specific basic node set to serve as a father node of the specific node set to which the each basic node belongs.

7. A method according to claim 1, wherein the step d) further comprises a substep of calculating a second weighting value to select the corresponding father node based on a distance between the each basic node and another one of the plurality of basic nodes, and a residual electric power of the another basic node.

8. A sensing system, comprising:
   a plurality of basic nodes;
   a plurality of father nodes, each of which is selected from the plurality of basic nodes, corresponds to at least one of the plurality of basic nodes, and receives a first message from the corresponding basic node;

a cluster head receiving the first message from the plurality of father nodes; and a base station receiving the first message from the cluster head, wherein the cluster head is selected based on a first maximum weighting value, the first maximum weighting value is calculated by a ratio of an overlapping area between a covering area of each of the plurality of basic nodes and a covering area of other basic node(s) of the plurality of basic nodes to the covering area of the each basic node.

9. A system according to claim 8, being a wireless sensor network system, and using a multi-hop routing algorithm including a calculation of plural rounds to select the cluster head based on the first maximum weighting value, and to select the plurality of father nodes based on a second maximum weighting value.

10. A system according to claim 9, wherein the first maximum weighting value is calculated to select the cluster head based on:

a residual electric power in each of the plurality of basic nodes; and a distance between the each basic node and the base station, wherein the covering area is a sensing area of the each basic node, and the sensing area includes one of a quantity of at least an interested spot to be sensed and an area to be sensed.

11. A system according to claim 9, wherein each of the plurality of basic nodes corresponds to at least a candidate node for transmitting the first message, and the second maximum weighting value is calculated based on a residual electric power of the candidate node and a respective distance between the candidate node and the each basic node so as to select one of the candidate node as the father node for the each basic node.

12. A system according to claim 9, wherein when one of the plural rounds in the multi-hop routing algorithm is completed, and at least one of the plurality of basic nodes still has an available electric power, then another one of the plural rounds proceeds.

13. A system according to claim 8, wherein the first message comprises at least one selected from a group consisting of codes of each of the plurality of basic nodes and the clustering head, residual electric quantities of the each basic node and the clustering head, hierarchical levels of the each basic node and the clustering head, a distance between the each basic node and one of the plurality of basic nodes adjacent to the each basic node, a distance between the cluster head and one of the plurality of basic nodes adjacent to the cluster head, and a sensing message including at least one of an environmental message and an environmental changing condition within a sensing area of the each basic node.

14. A system according to claim 13, wherein the sensing message comprises one selected from a group consisting of a parameter, an image message, an audio message and a combination thereof.

15. A routing method for a network, comprising steps of:
a) selecting one of a plurality of basic nodes as a cluster head based on a first weighting value, wherein the first weighting value is calculated by a ratio of an overlapping area between a covering area of each of the plurality of basic nodes and a covering area of other basic node(s) of the plurality of basic nodes to the covering area of the each basic node;
b) building a plurality of hierarchical levels for the plurality of basic nodes based on an information associated with the cluster head; and
c) sequentially transmitting a first message by the plurality of basic nodes according to the hierarchical levels.

16. A method according to claim 15, further comprising steps of:
d) receiving the first message by the cluster head; and
e) transmitting the first message to a base station by the cluster head.

17. A method according to claim 16, further comprising a step of:
f) repeating the steps a) to e) when at least one of the plurality of basic nodes still has an available electric power.

18. A method according to claim 15, wherein the step a) further comprises a substep of calculating a first weighting value to select the cluster head based on:

a residual electric power in each of the plurality of basic nodes; and a distance between the each basic node and the base station, wherein the covering area is a sensing area of the each basic node, and the sensing area includes one of a quantity of at least an interested spot to be sensed and an area to be sensed.

19. A method according to claim 15, wherein each of the plurality of basic nodes corresponds to at least a candidate node for transmitting the first message, the step b) further comprises a substep of building the plurality of hierarchical levels based on a respective distance between the each basic node and the cluster head, and the step c) further comprises a substep of calculating a second weighting value based on a residual electric power of the candidate node and a respective distance between the candidate node and the each basic node to determine which candidate node in each of the hierarchical levels is to receive the first message.

20. A method according to claim 15, wherein the first message comprises at least one selected from a group consisting of codes of each of the plurality of basic nodes and the cluster head, residual electric quantities of the each basic node and the cluster head, the hierarchical levels of the each basic node and the cluster head, a distance between the each basic node and one of the plurality of basic nodes adjacent to the each basic node, a distance between the cluster head and one of the plurality of basic nodes adjacent to the cluster head, and a sensing message including at least one of an environmental message and an environmental changing condition within a sensing area of the each node.

* * * * *